United States Patent [19]

Moritz

[11] 4,104,871
[45] Aug. 8, 1978

[54] ENERGY CONDUCTING CHAIN

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 790,172

[22] Filed: Apr. 25, 1977

[30] Foreign Application Priority Data

May 18, 1976 [DE] Fed. Rep. of Germany ....... 2622006

[51] Int. Cl.² ........................................... F16G 13/16
[52] U.S. Cl. ...................................... 59/78.1; 248/49; 248/68 R
[58] Field of Search .................... 59/78.1; 248/49, 51, 248/68 R, 68 CB

[56] References Cited

U.S. PATENT DOCUMENTS

| 3,382,668 | 5/1968 | Berkes | 59/78.1 |
| 3,848,407 | 11/1974 | Moritz | 59/78.1 |
| 4,018,411 | 4/1977 | Hennig | 59/78.1 |

FOREIGN PATENT DOCUMENTS 79,554  11/1962  France ................................. 248/68 CB Primary Examiner—C.W. Lanham
Assistant Examiner—Gene P. Crosby
Attorney, Agent, or Firm—Martin A. Farber

[57] ABSTRACT

An energy conducting chain for guiding of transmission lines between a moveable consumer and a stationary terminal with divisible stays comprising at least two belts with flattened cross-section and rounded narrow sides as well as separation stays arranged between the belts. The upper and lower ends of the separation stays have beveled recesses provided with undercuts, so that the belts after insertion in the recesses are braced or deformed in a force-locked manner and positively without slipping with the separation stays by twisting the belts about their longitudinal axes, respectively. The belts have threaded bores in their ends in which screws passing through the chain links can be screwed. Reinforcement plates are inserted between the belts and the links of the chain.

5 Claims, 2 Drawing Figures

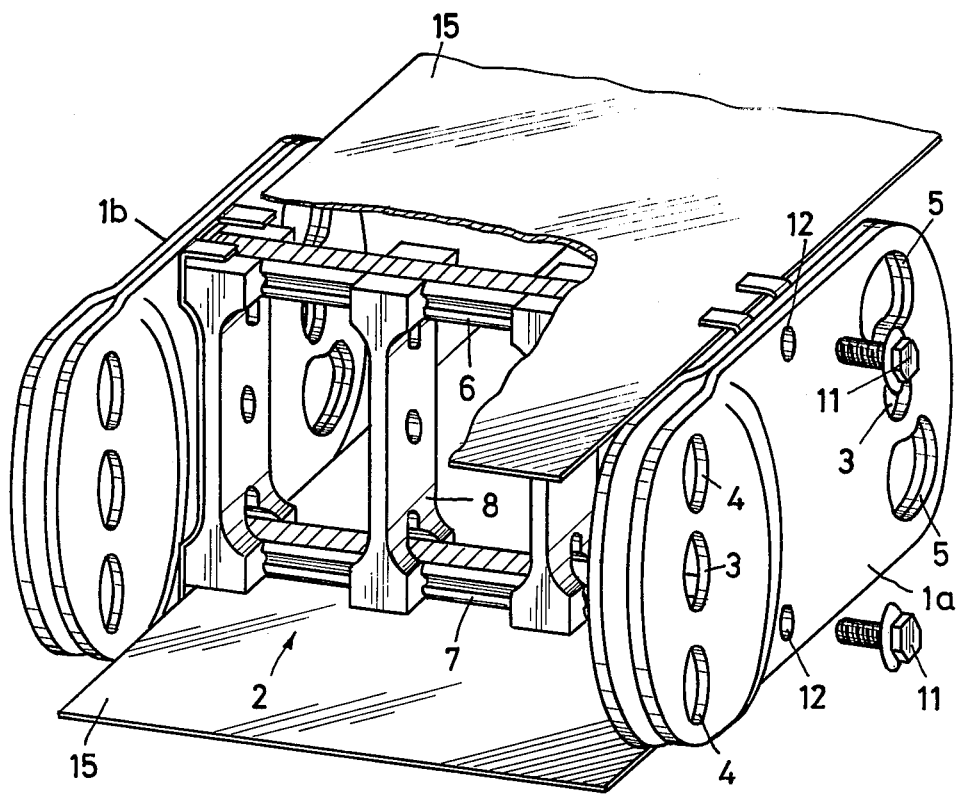
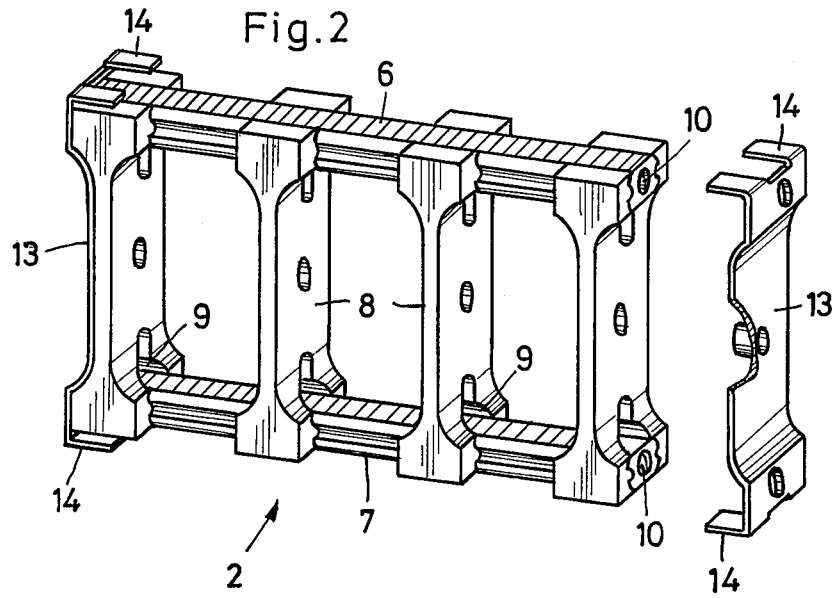

ENERGY CONDUCTING CHAIN

Energy conducting chain for guiding of transmission lines between a moveable consumer and a stationary terminal with divisible stays, which are made of at least two belts with flattened cross-section and rounded narrow sides as well as separation stays arranged between same, which separation stays on the upper and lower ends have beveled recesses provided with undercuts, so that the belts after insertion in the recesses are braced or deformed force-locked and positively without slipping with the separation stays by twisting about its longitudinal axis.

An energy conducting or guiding chain with a divisible stay of the previously described construction is known (German Pat. No. 2,255,283 and the corresponding U.S. Pat. No. 3,848,407). With this known stay particular head pieces are provided on the ends in order to connect the stay with the brackets or links of the chain. The invention is based on the task to so improve the divisible web of the energy guiding chain according to German Pat. No. 2,255,283 such that the particular head pieces for the connection with the brackets of the chain are no longer required.

This task is solved in accordance with the present invention in the manner that the belts are provided on their ends with threaded bores in which the screws passing through the brackets or links of the chain can be screwed-in. Between the belts and the brackets or links of the chain, reinforcement plates can be inserted in order to increase the transverse rigidity of the stays. Additionally it is proposed to provide the ends of the reinforcement plates with clasps or clamps for pullingin a cover band.

An energy carrying chain with the stay formed in accordance with the present invention has the advantage that the separation webs, and indeed particularly also the endsidestanding separation webs which are adjacent the brackets of the chains can be identically formed. Since the separation webs preferably are made of an elastic synthetic plastic material, for example Nylon, it has proven purposeful, to improve the transverse rigidity of the web with reinforcement plates inserted between the belts and the brackets of the chain, which can be provided on their ends with clamps for drawing-in a cover band.

Further particulars and advantages of the subject of the invention result from the following description of the corresponding drawing, in which one web formed in accordance with the present invention is illustrated. In the drawing show:

FIG. 1 is a prespective view broken away in part of one chain member with stay and drawn-in cover bands in isometric illustration; and FIG. 2 is an isometric illustration of one stay.

In FIG. 1 one member of an energy conducting chain is illustrated which is made of two plates or brackets 1a and 1b constituting chain links as well as a stay 2 secured between same, which stay in for the reception of the energy conductors or transmission lines (not illustrated). A plurality of brackets 1a or 1b can be connected with one another into a pivot or hinge chain, in the manner that they are assembled or pinned together and hinge bolts or pins (not illustrated) are inserted in bores 3. The mutual pivoting angle of the individual brackets 1a and 1b of a pivot chain can be limited by means of bolts which are inserted in bores 4 and slots 5, respectively.

The stay 2 which is formed in accordance with the present invention, comprises a cross-tie upper belt or strap 6, a cross-tie lower belt or strap 7 and a plurality of separation stays 8 which are arranged between these two belts or straps.

The belts 6 and 7 have a flat cross-section and on their narrow sides are formed in cross-section circuitry arc-shaped. All circular arcs lie on the identical circle. Undercut believed recesses 9 are arranged in the separation webs 8 on the upper and lower ends, which believed recesses are notched or tapered on their outer side or surface. The recesses 9 have a substantially circular-shaped cross-section. The diameter of the recesses 9 is purposefully slightly smaller than the diameter of the circular arc, on which the circular sections of the belts 6 and 7 lie, so that a force-locking and positive, without slipping or friction, snug fit can be achieved.

For assembly of the stays 2, initially the separation stays 8 are secured on the belts or chords 6, 7. For this the belts 6, 7 are introduced into the recesses 9 with one narrow side and turned by 90° about their longitudinal axes. For connection of the stay (which is pre-mounted or pre-assembled in this manner) with the brackets 1a, 1b, threaded bores 10 are provided in the belts 6, 7 for screwing screws 11 therein. The screws 11 engage or grip through bores 12 in the brackets 1a and 1b.

In order to improve the transverse rigidity of the stay 2, between the belts 6, 7 and the brackets 1a and 1b reinforcement plates 13 are inserted, which are provided on their ends with clamps 14 for the pulling or drawing-in of the cover bands 15.

All new features illustrated in the drawing and described in the specification are material to the invention, also insofar as they are not expressly claimed in the following claims.

I claim:

1. An energy conducting chain for the guiding of transmission lines between a moveable consumer and a stationary terminal comprising
    links of the chain,
    divisible stays, the latter being made of at least two belts each having a flattened cross-section and rounded narrow sides, and a plurality of separation stays arranged between said two belts, said separation stays having upper and lower ends formed with beveled recesses provided with undercuts, said belts being inserted in said recesses and held force-locked and positively without slipping with said separation stays upon twisting about a longitudinal axis thereof,
    said belts having ends and being formed with threaded bores in said ends,
    screw means for penetrating through said links of the chain and screwed-into said threaded bores,
    reinforcement plates inserted between said belts and said links of the chain.

2. The energy conducting chain according to claim 1, wherein
    said rounded narrow sides of said belts each are complementary to said beveled recesses of said ends of said separation stays in the inserted and twisted position of the belts in said recesses,
    each of said beveled recesses have lateral side surfaces engaging one of said narrow sides of one of said belts, respectively, each of said lateral side surfaces of said beveled recesses is formed with two arcs and an inwardly directed small projection therebetween, all of said arcs of all of said lateral side surfaces of said beveled recesses have the same radius.

3. The energy conducting chain according to claim 1, further comprising
    clamps formed on ends of said reinforcement plates,
    a cover band pulled-in under said clamps.

4. The energy conducting chain according to claim 3, wherein
    said separation stays have a slab-shaped center portion integrally connected to said upper and lower ends, said center portion is substantially thinner in the direction of the longitudinal axis than that of said upper and lower ends, whereby said separation stays have a substantially barbell shape in cross-section,
    said reinforcement plates have an inner periphery substantially complementary to one side of said separation stays and complementarily engage thereat against one of said separation stays, respectively, said reinforcement plates having end portions abutting one of said links on a side of said reinforcement plates opposite to said inner periphery,
    said end portions are formed with openings,
    said screw means passes through said openings in said end portions of said reinforcement plates,
    said clamps constitute projections extending in the longitudinal direction of said belts and spaced adjacent to said ends of said separation stays, said cover band extends between said links between said projections and said ends of said separation stays.

5. The energy conducting chain according to claim 4, wherein
    said separation stays are formed with central openings in the center of said slab-shaped center portions,
    said reinforcement plates have center projections extending from said inner periphery thereof aligned with said central openings.

* * * * *